(12) United States Patent
Ryan et al.

(10) Patent No.: US 10,810,085 B2
(45) Date of Patent: Oct. 20, 2020

(54) BASEBOARD MANAGEMENT CONTROLLERS FOR SERVER CHASSIS

(71) Applicant: Western Digital Technologies, Inc., San Jose, CA (US)

(72) Inventors: Robert P. Ryan, Mission Viejo, CA (US); Dean M. Jenkins, La Canada Flintridge, CA (US); Eric Lee, Denver, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 350 days.

(21) Appl. No.: 15/640,234

(22) Filed: Jun. 30, 2017

(65) Prior Publication Data

US 2019/0004901 A1    Jan. 3, 2019

(51) Int. Cl.
| G06F 13/00 | (2006.01) |
| G06F 11/14 | (2006.01) |
| G06F 13/20 | (2006.01) |
| G06F 1/3234 | (2019.01) |
| G06F 11/30 | (2006.01) |

(52) U.S. Cl.
CPC ........ *G06F 11/1441* (2013.01); *G06F 1/3253* (2013.01); *G06F 13/20* (2013.01); *G06F 11/3058* (2013.01); *G06F 2201/805* (2013.01)

(58) Field of Classification Search
None
See application file for complete search history.

(56) References Cited

U.S. PATENT DOCUMENTS

| 8,930,725 B2 | 1/2015 | Wang |
| 9,456,522 B2 | 9/2016 | Aimone |

(Continued)

OTHER PUBLICATIONS

Pending U.S. Appl. No. 15/640,295, filed Jun. 30, 2017, entitled "Automatic Hostname Assignment for Microservers", Robert P. Ryan.

(Continued)

*Primary Examiner* — Henry Tsai
*Assistant Examiner* — Dean Phan
(74) *Attorney, Agent, or Firm* — Barry IP Law, P.C.

(57) ABSTRACT

A server chassis includes a plurality of microservers with each microserver including a Micro Baseboard Management Controller (μBMC) and at least one processor for controlling operation of the microserver. A BMC communication manager of the server chassis directly communicates with each μBMC of the plurality of micro-servers. A Chassis BMC (CBMC) connects to the BMC communication manager and communicates with the BMC communication manager via a plurality of communication protocols. The BMC communication manager translates at least one of the plurality of protocols to a different protocol for direct communication with each μBMC. According to one aspect, a μBMC is connected to an out-of-band port of a microserver for communicating with at least one processor of the microserver. According to another aspect, the BMC communication manager includes at least one CBMC connector for communicating with the CBMC, and a plurality of μBMC ports for communicating directly with a respective μBMC.

25 Claims, 7 Drawing Sheets

(56) References Cited

U.S. PATENT DOCUMENTS

| | | | |
|---|---|---|---|
| 2002/0105924 A1* | 8/2002 | Yang | H04L 47/6215 370/329 |
| 2008/0104424 A1* | 5/2008 | Jennings | G06F 1/3209 713/300 |
| 2008/0222310 A1* | 9/2008 | Karstens | G06F 1/183 710/2 |
| 2009/0055665 A1* | 2/2009 | Maglione | G06F 1/206 713/320 |
| 2012/0005344 A1 | 1/2012 | Kolin et al. | |
| 2013/0254361 A1 | 9/2013 | Liu et al. | |
| 2014/0344431 A1* | 11/2014 | Hsu | H04L 41/044 709/223 |
| 2015/0089221 A1 | 3/2015 | Taylor et al. | |
| 2015/0195246 A1 | 7/2015 | Ryu et al. | |
| 2016/0080210 A1* | 3/2016 | Lai | G06F 13/20 709/224 |
| 2016/0104101 A1 | 4/2016 | Lambert et al. | |
| 2016/0349993 A1 | 12/2016 | Udupi et al. | |
| 2016/0381155 A1 | 12/2016 | Pan et al. | |
| 2017/0139592 A1* | 5/2017 | Qin | G06F 13/4022 |
| 2017/0257275 A1 | 9/2017 | Atyam et al. | |
| 2017/0322613 A1* | 11/2017 | Lin | G06F 1/3209 |
| 2017/0364375 A1 | 12/2017 | Ku et al. | |
| 2018/0120914 A1 | 5/2018 | Donlin | |

OTHER PUBLICATIONS

Hewlett-Packard Development Company, L.P., "HP MicroServer Remote Access Card User Manual", Feb. 2013, Edition 2.

Minyard, Corey, Montavista Software, "IPMI-A Gentle Introduction with OpenIPMI", Feb. 10, 2006.

Wikipedia, "Intelligent Platform Management Interface", May 21, 2016, https://web.archive.org/web/20160521152117/https://en.wikipedia.org/wiki/Intelligent_Platform_Management_Interface.

* cited by examiner

BASEBOARD MANAGEMENT CONTROLLERS FOR SERVER CHASSIS

BACKGROUND

The use of microservers is becoming increasingly popular due to their efficient use of space and scalability in locations such as data centers. Such microservers can include a main board including processing and memory resources on a single board. The microservers are typically grouped together in a server chassis to reduce the amount of space needed for the microservers and to share services provided by the server chassis such as fans and sensors. In some cases, the microservers may be converged microservers that also include one or more data storage devices, such as a Hard Disk Drive (HDD) or a Solid-State Drive (SSD).

In performing maintenance or setting up microservers, a management network may connect sideband ports of each of the microservers to collect information such as error statuses or operating conditions from the microserver. In some server chassis, sideband ports may be networked together with a Baseboard Management Controller (BMC) in the server chassis to provide a master/slave Inter-Integrated Circuit (I2C) bus or a System Management Bus (SMBus) that can allow for a single point of connection to the BMC acting as a master for accessing basic management information from the microservers via the I2C or SMBus.

However, accessing information through a master/slave I2C bus or SMBus can be difficult since the I2C bus or SMBus may be daisy-chained or involve a shared bus that is more prone to having requests time out when requests for information are passed from microserver to microserver or sent on a bus shared by a large number of microservers. This can be especially troublesome when the server chassis includes a relatively large number of microservers, such as 50 to 60 microservers. Obtaining information via a conventional BMC can therefore take a long time since the I2C or SMBus is relatively slow, and may require resending requests multiple times. In addition, if the functionality of one of the sideband ports of a microserver in the bus fails, it may not be possible to communicate with other microservers past the point of failure in the bus.

In such cases, or in situations where a faster or more reliable connection to a microserver is needed, the particular microserver may need to be physically located and removed from the server chassis to connect a laptop to a console or management port of the microserver using a special connector for troubleshooting, repairs, or updates for the microserver. In addition, if the microserver is not operating properly or is in an error state, such as when an Operating System (OS) of the microserver crashes or is otherwise unavailable, or if the microserver's boot partition has been damaged, accessing management information using an I2C bus or SMBus, or alternatively using a restful interface such as Intelligent Platform Management Interface (IPMI) via a side-band or in-band port is usually not possible.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Environment

Figure 1:
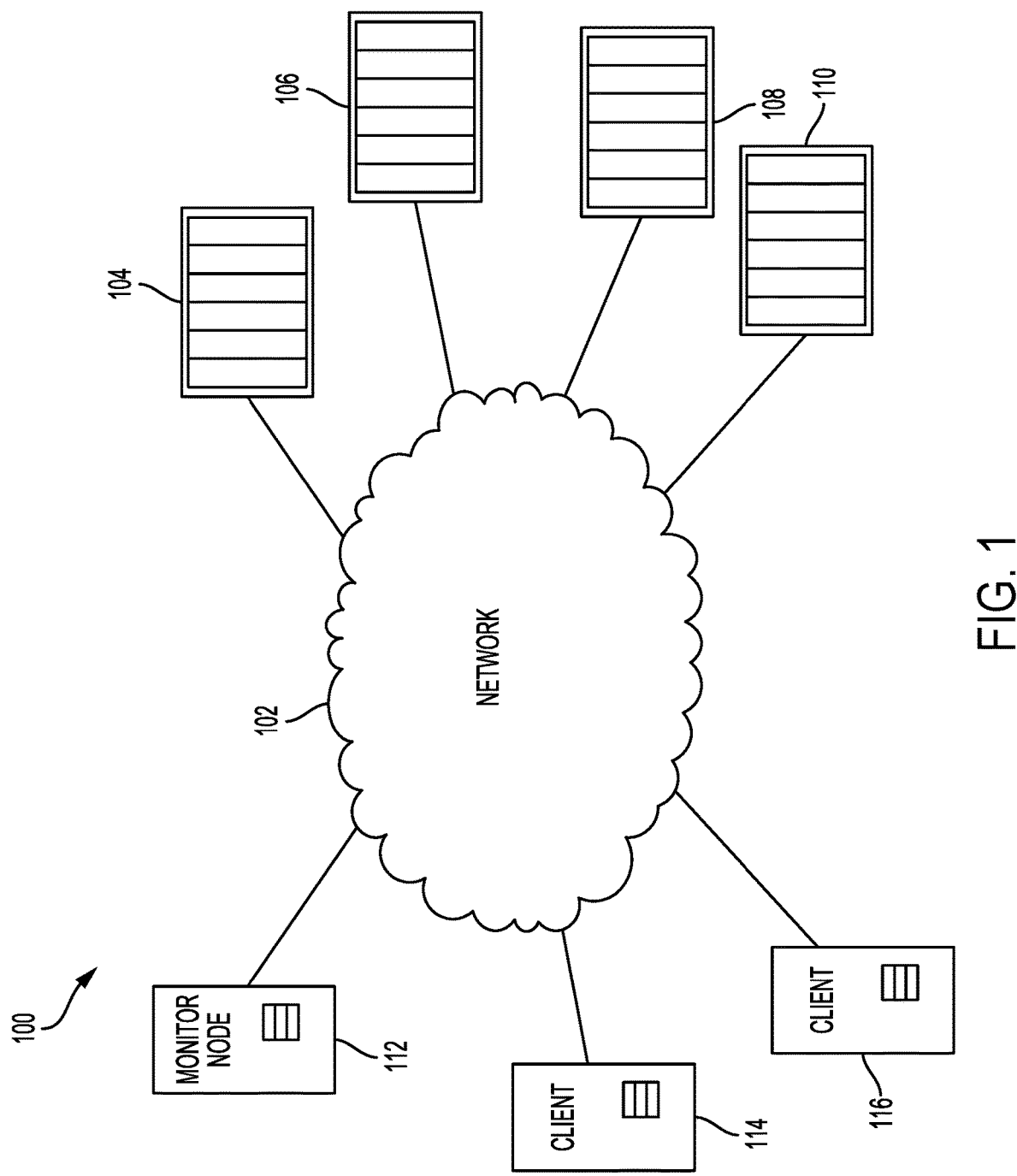
FIG. 1 depicts an example server network according to an embodiment.

FIG. 1 depicts an example server network according to an embodiment. As shown in FIG. 1, server network 100 includes network 102 connecting monitor node 112, client 114, client 116, and server chassis 104, 106, 108, and 110. In some implementations, server network 100 can include a data storage center or a data storage network for distributed data storage with converged microservers included in each of server chassis 104, 106, 108, and 110 providing data storage. In other implementations, server network 100 may be used for distributed computing performed by microservers included in each of server chassis 104, 106, 108, and 110.

For example, client 114 or client 116 may use microservers in one or more server chassis for storing data remotely such as for a cloud or social media application executed by the client or for a distributed computing or big data application executed by the client. In this regard, the devices shown in FIG. 1 for server network 100 may or may not be physically co-located so that network 102 may include a local area network, a wide area network, or the internet.

Monitor node 112 can include a client or other storage device that maps the microservers included in server network 100. Such mapping may be performed by, for example, executing a software defined storage platform such as CEPH or RIAK at monitor node 112. In the example of CEPH, monitor node 112 may generate a Controlled Replication Under Scalable Hashing (CRUSH) map for distributing data objects among the microservers in server network 100, which may each serve as an Object Storage Device (OSD).

Those of ordinary skill in the art will appreciate that other implementations can include more or less than those components shown in FIG. 1 and that the processes discussed below can be implemented in other environments. For example, other implementations can include a different number of server chassis, clients, or monitor nodes. For example, some implementations may not include a monitor node or may not require a mapping of the microservers in server network 100.

Server Chassis Examples

Figure 2:
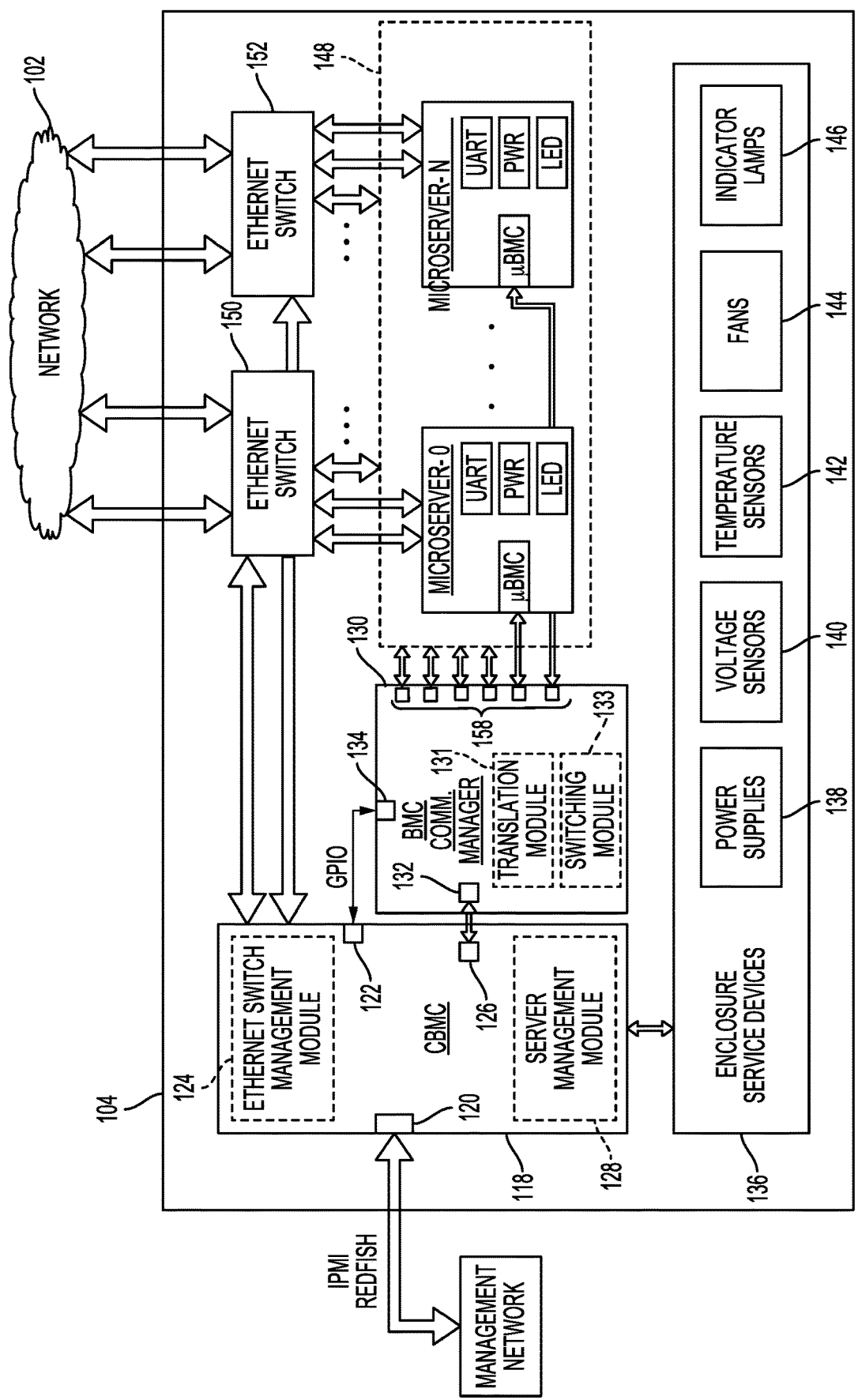
FIG. 2 is a block diagram of a server chassis including a Chassis Baseboard Management Controller (CBMC), a Baseboard Management Controller (BMC) communication manager, and a pool of microservers according to an embodiment.

FIG. 2 is a block diagram of server chassis 104 according to an embodiment. As shown in FIG. 2, server chassis 104 includes a Chassis Baseboard Management Controller (CBMC) 118, Baseboard Management Controller (BMC) communication manager 130, enclosure service devices 136, microserver pool 148, and Ethernet switches 150 and 152.

Server chassis 104 connects to network 102 via Ethernet switches 150 and 152, which can manage a main or in-band data path used by the microservers in microserver pool 148 (e.g., microserver-0 to microserver-N). In more detail, each microserver in microserver pool 148 can connect to one or both of Ethernet switches 150 and 152 using, for example, a Serial Gigabit Media Independent Interface (SGMII). In some implementations, each microserver may connect to Ethernet switches 150 or 152 at speeds of 1 or 2.5 gigabits per second (i.e., for 1.0 Gigabit Ethernet (GbE) or 2.5 GbE). As understood by those of ordinary skill in the art, these example speeds are expected to increase for future implementations as costs decrease for communication and storage technology. For their part, Ethernet switches 150 and 152 can provide Ethernet data ports to a Top Of Rack (TOR) switch with a greater bandwidth (e.g., 10, 25, 40, or 50 gigabits per second) for the main data path of server chassis 104. As with the connection speed or bandwidth for each microserver, the bandwidth for server chassis are expected to continue to increase in the future. In addition to providing greater bandwidth for the main data path, Ethernet switches 150 and 152 can also provide redundancy in case one Ethernet switch fails, becomes a bottleneck for data traffic, or is otherwise unavailable.

Figure 3:
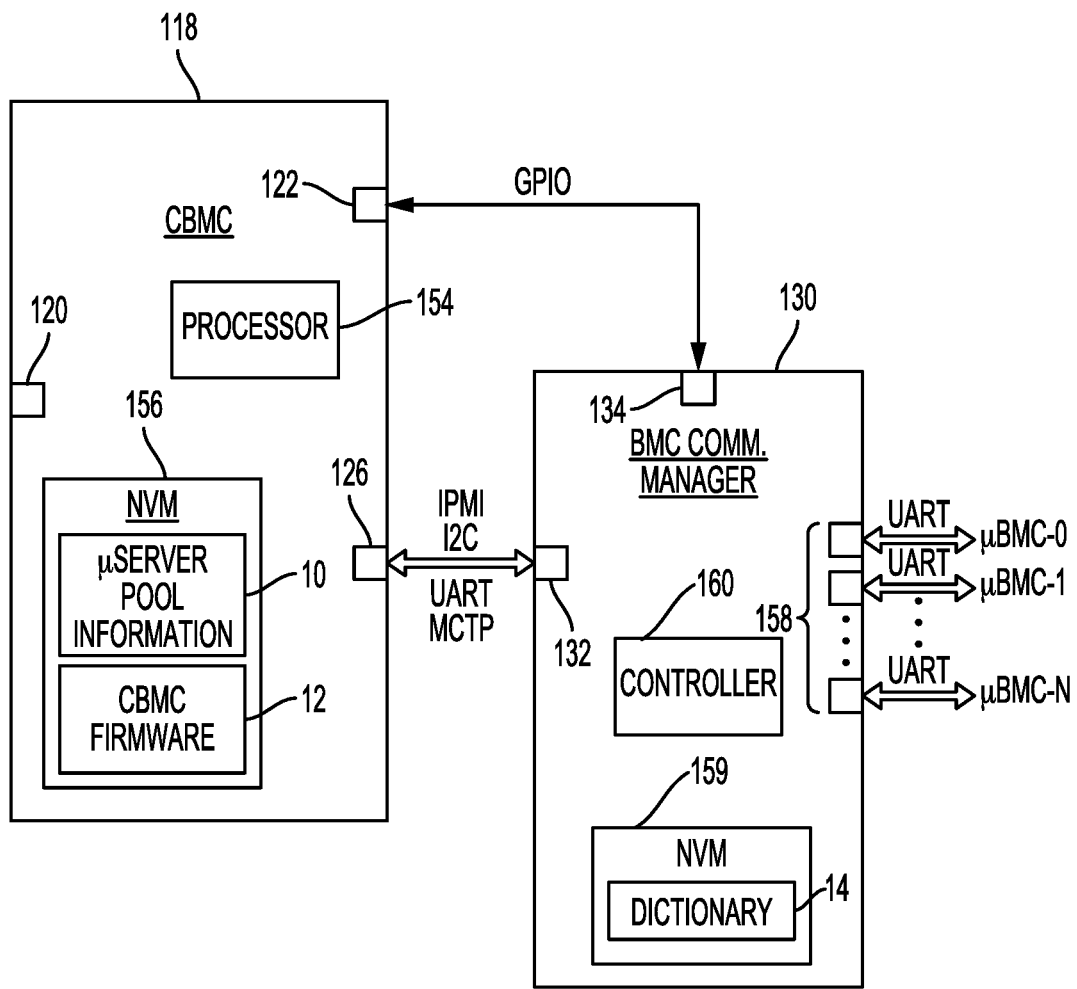
FIG. 3 is a block diagram of a CBMC and a BMC communication manager according to an embodiment.

CBMC 118 can manage Ethernet switches 150 and 152 using Ethernet switch management module 124, which can include hardware and/or software executed by a processor of CBMC 118 (e.g., processor 154 in FIG. 3). Such management of Ethernet switches 150 and 152 by CBMC 118 may include, for example, control of power supplied to Ethernet switches 150 and 152, distribution of data traffic between Ethernet switches 150 and 152, and/or monitoring of data traffic handled by each Ethernet switch.

As shown in FIG. 2, CBMC 118 also connects to a management network via management port 120. The management network may use Intelligent Platform Management Interface (IPMI), for example, or a restful interface such as Redfish. The management network may be used to collect information about server chassis 104 or for monitoring server chassis 104.

CBMC 118 can control enclosure service devices 136 using server management module 128, which can include hardware and/or software executed by a processor of CBMC 118 (e.g., processor 154 in FIG. 3). In the example of FIG. 2, enclosure service devices 136 include power supplies 138, voltage sensors 140, temperature sensors 142, fans 144, and indicator lamps 146. Power supplies 138 can supply power to components in server chassis 104, such as microservers in microserver pool 148, Ethernet switches 150 and 152, CBMC 118, and BMC communication manager 130. Voltage sensors 140 can detect variations in the power supplied to the components in server chassis 104 to allow server management module 128 to take precautionary actions, such as turning off a power supply of power supplies 138 if a voltage exceeds a threshold, or monitor a power state of a device such as an amount of power consumed by a particular microserver. Temperature sensors 142 can detect temperatures in server chassis 104 to allow server management module 128 to control localized fans 144 (e.g., turn on or increase a fan speed) in server chassis 104 based on the detected temperatures to cool specific areas in server chassis 104. Indicator lamps 146 may be controlled by server management module 128 to indicate conditions in server chassis 104, such as a high temperature condition or which microservers may be powered on. Other implementations of enclosure service devices 136 can include different components, such as, for example, a Liquid Crystal Display (LCD) that may also include touchscreen navigation for accessing information collected by CBMC 118.

As shown in FIG. 2, CBMC 118 communicates with BMC communication manager 130 via BMC connectors including BMC port 126 and General Purpose Input/Output (GPIO) pin 122. As discussed in more detail below with reference to FIG. 3, CBMC 118 can communicate with BMC communication manager 130 using multiple protocols, such as Inter-Integrated Circuit (I2C), Universal Asynchronous Receiver/Transmitter (UART), General Purpose Input/Output (GPIO), Intelligent Platform Management Interface (IPMI), and Management Component Transport Protocol (MCTP). BMC communication manager 130 uses translation module 131, which may include hardware and/or software executed by a processor of BMC communication manager 130 (e.g., controller 160 in FIG. 3), to translate at least one protocol to a different protocol for communication with a Micro Baseboard Management Controller (µBMC) at each microserver in microserver pool 148. In this regard, translation module 131 can include or be executed by, for example, a microcontroller, a System on a Chip (SoC), a Digital Signal Processor (DSP), an Application Specific Integrated Circuit (ASIC), a Field Programmable Gate Array (FPGA), hard-wired logic, analog circuitry and/or a combination thereof.

Each µBMC is directly connected to BMC communication manager 130 at a corresponding µBMC port 158 that allows for a full duplex communication protocol such as serial UART that can facilitate a point-to-point session that would not be possible using a master/slave communication protocol such as I2C. This can allow each microserver to appear as an individual server to allow for a more granular level of communication with each microserver than traditionally available in a conventional server chassis.

In addition, more information can be exchanged between CBMC 118 and each µBMC with a wider range of commands or instructions for the microservers than using more conventional BMC communication protocols within a server chassis, such as I2C. As used herein, instructions can include commands, settings, and queries sent from CBMC 118 to one or more microservers. The wider range of instructions may include, for example, powering on or off a particular microserver and/or its Data Storage Device (DSD), changing a Basic Input/Output System (BIOS) of the microserver, setting the microserver for local booting from a memory of the microserver or network booting from another microserver (e.g., from a Preboot eXecution Environment (PXE) server), or setting the microserver to act as a network boot server (e.g., as a PXE server), a Dynamic Host Configuration Protocol (DHCP) server, or a Network Time Protocol (NTP) server for other microservers. The additional functionality provided by either or both of the direct connections to µBMCs at each microserver as shown in FIG. 2 and the use of a full duplex protocol can ordinarily allow for remote power cycling and remote updating of firmware or other settings at each microserver. For example, a management operator using monitor node 112 or a client such as clients 114 or 116, may restart, update, or repair individual microservers from a remote location via a private management port in the data center.

In addition, the communication with each microserver through the μBMCs shown in FIG. 2 is typically faster and more reliable than conventional BMC arrangements that use a daisy-chained or shared bus where messages and commands need to be passed from one microserver to the next or shared by many microservers, or where any microserver along the bus can become a point of failure for a message or command on the bus. A daisy-chained or shared bus arrangement can be particularly troublesome for server chassis with many microservers, such as 50 or 60 microservers since this can provide a greater number of points of failure and/or a longer time for commands or messages to travel to and from a CBMC.

In some implementations, CBMC 118 can use GPIO pin 122 to select communication with one or more of the μBMCs of the microservers via CBMC pin 134 on BMC communication manager 130. In other implementations, CBMC 118 can select communication with one or more of the μBMCs via CBMC port 132 on BMC communication manager 130. The selection may be performed by CBMC 118 sending an identifier or a recipient indicator corresponding to one or more microservers to receive an instruction. In some cases, CBMC 118 may select a single μBMC or microserver to receive an instruction. In other cases, CBMC may send the instruction to all or multiple μBMCs or microservers. In some implementations, BMC communication manager 130 can include as switching module 133, for example, an FPGA or other hardware configured as a demultiplexer (demux) to send the instructions received via a CBMC connector of BMC communication manager 130 (e.g., CBMC port 132 or CBMC pin 134) to multiple μBMCs, and also configured as a multiplexer (mux) to receive messages from multiple μBMCs to send to CBMC 118 via a CBMC connector of BMC communication manager 130 (e.g., CBMC port 132 or CBMC pin 134).

As shown in FIG. 2, and as discussed in more detail below with reference to the example microserver of FIG. 5, each of the microservers in microserver pool 148 can include a power controller (i.e., PWR in FIG. 2), an Out-of-Band (OoB) port (i.e., OoB port 168 in FIG. 5), and a Light Emitting Diode (LED) (i.e., LED in FIG. 2) that can be used or controlled by the μBMC at the microserver.

Those skilled in the art will appreciate that some of the components shown for server chassis 104 in FIG. 2 may differ in other implementations. For example, a different server chassis may include a different number of Ethernet switches or different devices for enclosure service devices 136.

FIG. 3 is a block diagram of CBMC 118 and BMC communication manager 130 according to an embodiment. As shown in FIG. 3, CBMC 118 includes processor 154, which can include, for example, a microcontroller, an SoC, a DSP, an ASIC, an FPGA, hard-wired logic, analog circuitry and/or a combination thereof. Processor 154 can execute CBMC firmware 12 stored in Non-Volatile Memory (NVM) 156 in implementing Ethernet switch management module 124 and/or server management module 128 discussed above with reference to FIG. 2.

NVM 156 can include, for example, a solid-state memory. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete Non-Volatile Memory (NVM) chips, or any combination thereof.

As shown in FIG. 3, NVM 156 also stores microserver pool information 10, which can include information about the microservers in microserver pool 148. Such information can include, for example, Media Access Control (MAC) addresses, or location information for each microserver such as aisle, rack, tray, and/or device slot numbers for different microservers. Microserver pool information 10 may include information obtained from μBMCs via BMC communication manager 130. Such information can include, for example, a MAC address of a microserver, a Central Processing Unit (CPU) type of a microserver, the number of processing cores used by a microserver, a Dynamic RAM (DRAM) capacity of a microserver, an amount of non-volatile data storage capacity available at the microserver, a non-volatile storage type provided by the microserver (e.g., flash memory, Storage Class Memory (SCM), or a Hard Disk Drive (HDD)), a supply voltage to the microserver, and/or a board temperature for the microserver. In some implementations, microserver pool information may be stored in a different memory, such as a volatile memory (e.g., DRAM) of CBMC 118.

The information included in microserver pool information 10 can be used for management and/or monitoring of microservers in microserver pool 148 by a remote device on network 102 (e.g., monitor node 112 or clients 114 or 116 in FIG. 1) or by a remote device external to server chassis 104 on the management network. For example, a microserver hostname, device slot number, and/or MAC address may be used by a remote device to identify a drive fault or temperature condition associated with a particular microserver in microserver pool 148.

In one example implementation, processor 154 may use location information in microserver pool information 10 to automatically assign hostnames to microservers in microserver pool 148 and/or associate microservers with a MAC address for the microservers. Examples of such automatic hostnaming of microservers using a CBMC can be found in co-pending U.S. patent application Ser. No. 15/640,295, filed on Jun. 30, 2017, and entitled "AUTOMATIC HOSTNAME ASSIGNMENT FOR MICROSERVERS", which is hereby incorporated by reference in its entirety.

BMC communication manager 130 communicates with CBMC 118 using a plurality of protocols via a CBMC connector, such as CBMC port 132 or CBMC pin 134. Such protocols may include, for example, I2C, Management Component Transport Protocol (MCTP), and UART. As discussed above with reference to translation module 131 of BMC communication manager 130 in FIG. 2, controller 160 translates at least one protocol used to communicate with CBMC 118 into a different protocol for communicating directly with μBMCs of the microservers in microserver pool 148 via μBMC ports 158. In translating protocols, controller 160 may use dictionary 14 to find corresponding commands or syntax for the different protocol. Controller 160 may also repackage the received instruction into a particular format for the different protocol.

In the example shown in FIG. 3, controller 160 executing translation module 131 translates I2C, MCTP, and IPMI instructions into instructions sent using UART, which can provide for a serial full duplex communication with each μBMC via μBMC ports 158. As noted above, using full duplex, such as with UART, can allow for a point-to-point session with an individual μBMC to allow for greater functionality to perform tasks such as updating a BIOS of a microserver or other firmware or settings of the microserver, which may not otherwise be possible using a master/slave communication protocol, such as I2C.

In some implementations, a processor of a microserver in microserver pool 148 (e.g., CPU 178 in FIG. 5) may send an indication of a fault condition of the microserver to BMC communication manager 130 via a μBMC port 158 using the μBMC of the microserver. BMC communication manager 130 may then add a tag to the fault condition to identify the microserver that sent the fault condition. In some cases, the tag may include a device slot number indicating a physical location of the microserver or other identifier for the microserver. BMC communication manager 130 can then send the fault condition and the tag to CBMC 118, which sends the fault condition and tag to a remote device external to server chassis 104, such as to a remote device connected to the management network accessed via port 120 of CBMC 118.

Figure 4:
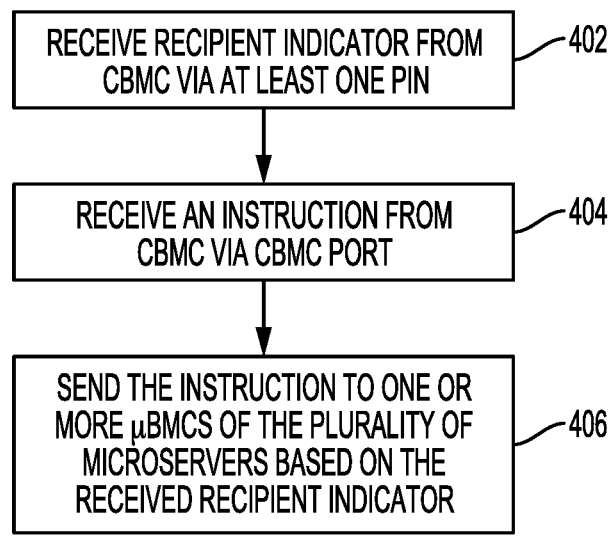
FIG. 4 is a flowchart for a BMC communication process according to an embodiment.

FIG. 4 is a flowchart for a BMC communication process that can be performed by controller 160 of BMC communication manager 130 according to an embodiment. In block 402, BMC communication manager 130 receives a recipient indicator from CBMC 118 via a CBMC connector of BMC communication manager 130 (e.g., CBMC port 132 or CBMC pin 134). The recipient indicator may include, for example, one or more identifiers, such as device slot numbers or microserver identifiers indicating microservers to receive an instruction from CBMC 118. In some cases, a specific value may be used to indicate that the instruction is to be sent to all of the microservers in microserver pool 148.

In block 404, BMC communication manager 130 receives an instruction from CBMC 118 via a CBMC connector of BMC communication manager 130 (e.g., CBMC port 132 or CBMC pin 134). As discussed above, the instruction can be sent using a variety of different protocols such as I2C, UART, IPMI, or MCTP.

In block 406, the instruction is sent to one or more μBMCs of the microservers in microserver pool 148 based on the recipient indicator received in block 402. In some cases, translation module 131 of BMC communication module 130 may translate the instruction received from CBMC 118 into a different protocol before sending the instruction to one or more μBMCs in block 406. In other cases, BMC communication manager 130 may pass the received instruction to the μBMC or μBMCs indicated by the recipient indicator. In the example of FIG. 3, BMC communication manager 130 may translate IPMI, I2C, and MCTP protocols into UART and pass UART instructions to the μBMC or μBMCs without translation. The translation performed by translation module 131 can include, for example, identifying a particular protocol, determining that the protocol does not match a protocol used for communication via μBMC ports 158, and translating a format and syntax of the instruction into a different format and syntax using dictionary 14 stored in NVM 159 of BMC communication manager 130.

Microserver Examples

Figure 5:
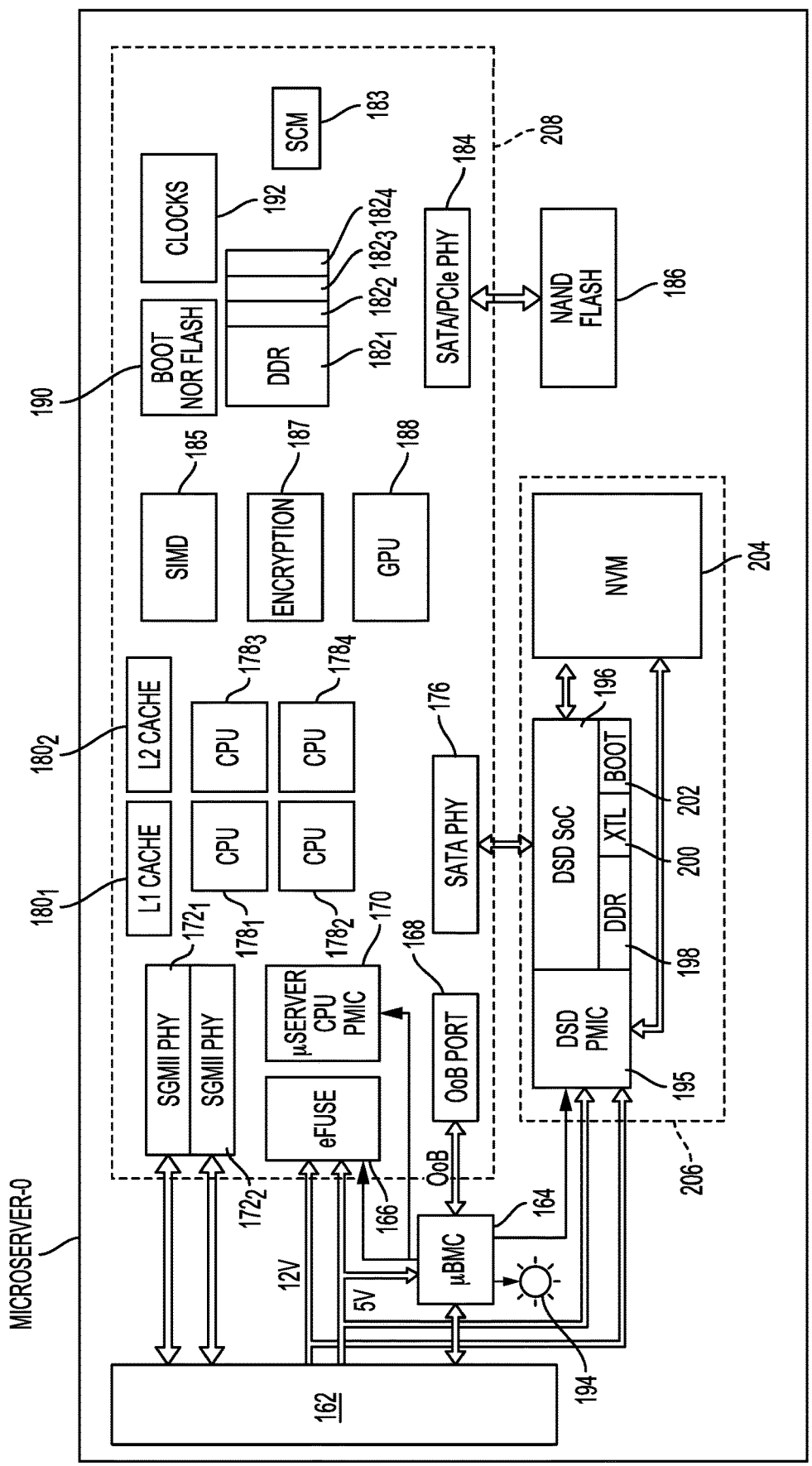
FIG. 5 is a block diagram of a microserver according to an embodiment.

FIG. 5 is a block diagram of a microserver in microserver pool 148 according to an embodiment. As shown in FIG. 5, microserver-0 includes connector 162, μBMC 164, processing components 208, DSD 206, and NAND flash 186. μBMC 164 connects to OoB port 168, which may include a console or management port conventionally used to connect a laptop in the field for troubleshooting a microserver. Such an OoB port may be configured for a protocol such as I2C and/or UART. OoB port 168 is out-of-band in the sense that it is separate from the in-band data traffic of SGMII PHY $172_1$ and SGMII PHY $172_2$, which are physical layer chips for connecting Ethernet to microserver-0. The separation of OoB port 168 from in-band data paths can ordinarily allow OoB port 168 to function during periods of high in-band data traffic or malfunction related to in-band data processing. In this regard, μBMC 164 can ordinarily provide a more consistent and reliable way of remotely connecting to and controlling microserver-0 than through the in-band data connection of SGMII PHYs 172.

As understood by those of ordinary skill in the art, microserver-0 may include one or more OoB ports in addition to OoB port 168. Such additional OoB ports may be used, for example, for OoB management of microserver-0 by connecting a laptop using a special connector to an OoB port or by connecting a keyboard or touchscreen device using a Universal Serial Bus (USB) connector.

Connector 162 can include, for example, an SFF-8640 connector or other connector that includes multiple lanes for input/output. As shown in FIG. 5, connector 162 provides connections for the OoB connection to μBMC 164, the SGMII connections for in-band data traffic, and power connections for 5V and 12V power.

Each of processing components 208, μBMC 164, and DSD 206 is separately powered. As discussed in more detail below with reference to the remote microserver power management process of FIG. 7, the separate powering of μBMC 164 can allow μBMC 164 to remain powered on while processing components 208 and/or DSD 206 power off. This can ordinarily allow μBMC 164 to provide information about microserver-0 and communicate with CBMC 118 even when the rest of microserver-0 is powered off.

μBMC 164 controls visual indicator device 194 to visually indicate a condition of microserver-0. In the example of FIG. 5, visual indicator device 194 can include a multi-colored LED to aid an operator in performing tasks at microserver-0, such as an LED capable of turning different colors to indicate different conditions. For example, the different colors of visual indicator device 194 can indicate a short, medium or long service life, a high, medium or low temperature, a high, medium or low remaining available storage capacity of DSD 206, a currently high, medium or low data traffic level, or other metrics or conditions of microserver-0. In an example implementation where visual indicator device 194 indicates a temperature condition, the microservers in microserver pool 148 can quickly provide a visual indication of temperatures across the server chassis to identify hot areas that may need more cooling. In other implementations, visual indicator device 194 can include a display, such as an LCD to visually indicate a metric or condition of microserver-0. Since μBMC 164 remains on even when processing components 208 or DSD 206 are off, visual indicator device 194 can continue to provide a visual indication of metrics or conditions even if processing components 208 or DSD 206 have failed, will not turn on, or are otherwise powered off.

As shown in FIG. 5, eFUSE 166 receives 5V and 12V power from connector 162, and protects processing components 208 to limit voltages and currents to safe ranges for the circuitry of processing components 208. Microserver Power Management Integrated Circuit (PMIC) 170 can act as a power controller for processing components 208, and distribute power among the components. Microserver PMIC 170 may also include power conversion or dynamic voltage scaling for different components of processing components 208. µBMC 164 is shown as connected to both eFUSE 166 and microserver PMIC 170, which can allow µBMC 164 to control the powering on or off of microserver components 208, or even particular components of microserver components 208. In other implementations, µBMC 164 may only be connected to one of eFUSE 166 or microserver PMIC 170 to control the powering on or off of microserver components 208.

Microserver components 208 also include CPUs $178_1$, $178_2$, $178_3$, and $178_4$ for performing processing tasks for microserver-0 by using L1 cache $180_1$ and L2 cache $180_2$ to temporarily store data modified or accessed by CPUs 178. µBMC 164 may communicate with CPUs 178 through OoB port 168 using an interface such as, for example, UART or I2C. In some implementations, µBMC 164 may communicate with CPUs 178 to change a BIOS of microserver-0, set microserver-0 for network booting (e.g., PXE booting) or local booting (e.g., from boot NOR flash 190, from NAND flash 186, or from NVM 204 of DSD 206), or set microserver-0 to act as a boot server or NTP server for other microservers within the same server chassis (e.g., server chassis 104 in FIG. 2) and/or outside the server chassis. In a case where microserver-0 has been set to act as a boot server and/or NTP server for other microservers in the same server chassis, this can ordinarily reduce the amount of network traffic outside of the server chassis to allow more bandwidth for in-band data since the microservers in the server chassis do not need to communicate with other servers outside of the server chassis (i.e., a reduction in east-west server to server traffic). This can be especially significant when there are a relatively large number of microservers in a server chassis (e.g., 50 to 60 microservers), which may each need to periodically update time settings or may all need to access a network boot server when booted at approximately the same time.

In some cases, µBMC 164 may communicate with CPUs 178 to set microserver-0 to boot in a diagnostic mode during a next boot sequence of microserver-0. For example, microserver-0 may be set to boot from a diagnostic partition instead of its typical boot partition. The diagnostic partition may be located, for example, in boot NOR flash 190, NAND flash 186, NVM 204, a memory of µBMC 164, or in an external device, such as a different microserver in the same or different server chassis, or a remote device, such as monitor node 112 or clients 114 or 116. Booting in the diagnostic mode may cause microserver-0 to perform various diagnostic actions or tests, such as performing certain stress tests (e.g., using an Operating System (OS) of microserver-0 to perform a memory stress test on DRAM or other memory of microserver-0), and checking various logs such as error logs pertaining to NVM 204 of DSD 206. In some implementations, the diagnostic mode may also cause microserver-0 to send diagnostic information, such as test results or logs to another device on network 102 or to CBMC 118 via µBMC 164.

In the example of FIG. 5, processing components 208 also include components or modules executed by CPUs 178, such as Simultaneous Instruction Multiple Data (SIMD) module 185 for performing parallel processing of data sets, encryption module 187 for encrypting data stored in NAND flash 186 or NVM 204 of DSD 206, Graphics Processing Unit (GPU) 188 for rendering images, and SCM 183.

SCM 183 can include a high speed, non-volatile memory (e.g., MRAM) of microserver-0. In some implementations, SCM 183 can use, for example, a parallel Double Data Rate (DDR) bus, serial PCIe bus, or other high-speed bus between CPUs 178 and SCM 183.

Boot NOR flash 190 can include boot instructions for initializing microserver-0 after powering on processing components 208. Such boot instructions may include, for example, BIOS instructions and instructions for loading an OS executed by CPUs 178 to manage hardware and software resources of microserver-0. For example, boot instructions from boot NOR flash 190 may cause CPUs 178 to load a Linux OS or other OS from an NVM such as NAND flash 186 or NVM 204 of DSD 206 during a startup process of microserver-0.

DDR Synchronous DRAM (DDR-SDRAM) $182_1$, $182_2$, $182_3$, and $182_4$ allow for the transfer of data via SGMII PHYs 172 by temporarily storing data to be sent from microserver-0 and data received by microserver-0. DDR-SDRAMs 182 operate on one or more clock signals received from clocks 192 in transferring data into and out of DDR-SDRAMs 182. In retrieving and storing data, CPUs 178 use interface PHYs 176 and 184 to communicate with DSD 206 and NAND flash 186, respectively. In the example shown in FIG. 5, interface PHY 176 uses a Serial Advanced Technology Attachment (SATA) standard, but other implementations may use a different standard such as PCI express (PCIe), Small Computer System Interface (SCSI), or Serial Attached SCSI (SAS). Along these lines, interface PHY 184 is shown as using both SATA and PCIe, but other implementations may use different interface standards.

DSD 206 includes DSD PMIC 195, DSD SoC 196, DDR-SDRAM 198, Translation Layer (XTL) 200, DSD boot instructions 202, and NVM 204. DSD SoC 196 includes at least one processor and memory for controlling operation of DSD 206. DSD SoC 196 may load boot instructions 202 as part of a startup process after DSD 206 is powered on.

NVM 204 can include a non-volatile storage such as one or more Hard Disk Drives (HDDs) that use one or more rotating magnetic disks as storage media. In other implementations, NVM 204 can include one or more Solid-State Drives (SSDs) that store data in a solid-state storage media such as, for example, a flash memory. In some implementations, NVM 204 may include a mix of different types of storage media, as in a hybrid drive that may use both rotating magnetic disks and solid-state memory for non-volatile data storage.

In transferring data to and from NVM 204, DSD SoC 196 may use DDR-SDRAM 198 to temporarily store data that is to be stored in NVM 204 or that has been read from NVM 204. DSD SoC 196 may also use XTL 200 in accessing data stored in NVM 204 by providing a translation layer to facilitate, for example, the physically sequential writing of data on a disk of NVM 204 for Shingled Magnetic Recording (SMR) or wear leveling performed for a solid-state memory of NVM 204.

DSD PMIC 195 serves as a power controller for DSD 206, and distributes power among the components of DSD 206, such as NVM 204 and DSD SoC 196. DSD PMIC 195 may also include power conversion or dynamic voltage scaling for different components of DSD 206. µBMC 164 is shown connected to DSD PMIC 195, which allows µBMC 164 to control the powering on or off of DSD 206 or the powering on or off of specific components of DSD 206, such as NVM 204.

As noted above, since μBMC 164 is separately powered and remains on after microserver components 208 and DSD 206 have powered off, μBMC 164 can be used to remotely power on or off microserver components 208 and/or DSD 206.

As appreciated by those of ordinary skill in the art, different implementations of microserver-0 may include a different number or arrangement of components, such as a different number of CPUs 178 or DDR-SDRAMs 182, or the omission of certain components such as GPU 188 or NAND flash 186. In some implementations, DSD 206 may be omitted such that microserver-0 primarily performs processing functions, as opposed to acting as a converged microserver that provides both processing functions and a significant amount of non-volatile data storage.

Figure 6:
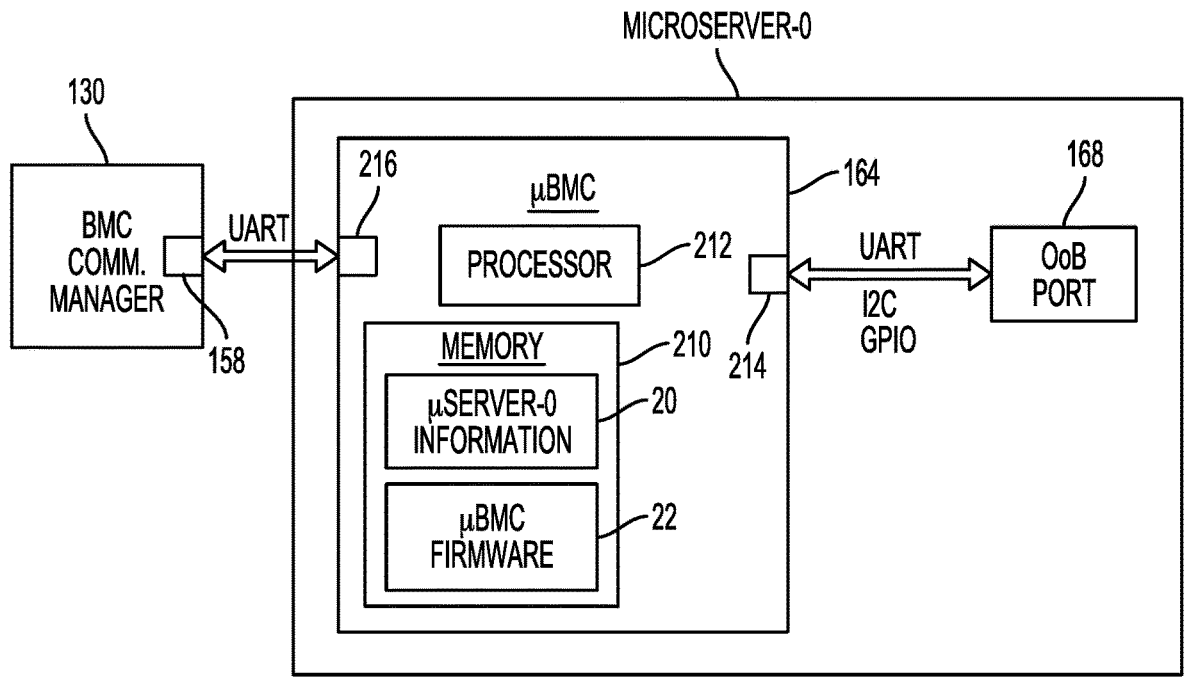
FIG. 6 is a block diagram of a Micro BMC (μBMC) according to an embodiment.

FIG. 6 is a block diagram of μBMC 164 according to an embodiment. As shown in FIG. 6, μBMC 164 includes processor 212 and memory 210. Processor 212 can include circuitry such as a microcontroller, an SoC, a DSP, an ASIC, an FPGA, hard-wired logic, analog circuitry and/or a combination thereof. Processor 212 can execute μBMC firmware 22 stored in memory 210 to perform processes of μBMC 164.

As shown in FIG. 6, μBMC 164 uses communication port 214 to communicate with CPUs 178 via OoB port 168. Communication port 214 may allow for communication using, for example, UART, I2C, or GPIO. In this regard, other implementations may include multiple communication ports 214 dedicated to one or more interface with CPUs 178.

Memory 210 can include, for example, a non-volatile solid-state memory or a volatile memory such as DRAM. In some implementations, processor 212 can perform the microserver power management process of FIG. 7 discussed below and/or the remote instruction process of FIG. 8 described below. In addition, processor 212 may control visual indicator device 194 as discussed above with reference to FIG. 5, or provide information about microserver-0 regardless of a power state or failure state of processing components 208 or DSD 206.

In this regard, memory 210 stores microserver-0 information 20, which can include, for example, a MAC address for the microserver, a CPU type for the microserver, the number of cores used by the microserver, a DRAM capacity of the microserver, an amount of NVM storage available in an HDD or SSD of DSD 206, location information such as a device slot number, Field Replaceable Unit (FRU) serial numbers, and/or health monitoring information such as error codes or logs that may indicate historical conditions such as high temperatures or power spikes. Since μBMC 164 remains powered on, this information can be remotely accessed for management or discovery from, for example, monitor node 112 or clients 114 or 116, even when microserver-0 is powered off or may otherwise be inaccessible via a main data path due to a failure of microserver-0 such as its OS crashing.

Figure 7:
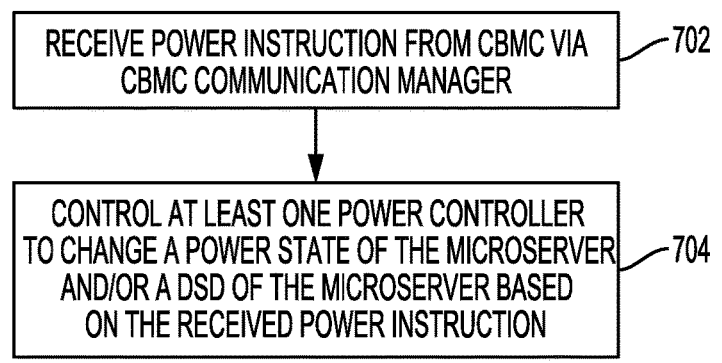
FIG. 7 is a flowchart for a remote microserver power management process according to an embodiment.

FIG. 7 is a flowchart for a remote microserver power management process that can be performed by μBMC 164 according to an embodiment. In block 702, μBMC 164 receives a power instruction from CBMC 118 via CBMC communication manager 130. As shown in FIG. 6, this may be received as a UART command, for example, via communication port 216 of μBMC 164.

In block 704, μBMC 164 controls at least one power controller to change a power state of microserver-0 and/or DSD 206 based on the received power instruction. Processor 212 of μBMC 164 may associate the received power instruction with one or both of processing components 208 or DSD 206 and then send a power off or power on signal to microserver PMIC 170, eFUSE 166, and/or DSD PMIC 195 to change the power state of processing components 208 and/or DSD 206. As noted above, the received power instruction may also allow for the powering on or off of a component within processing components 208 or a particular component of DSD 206, such as NVM 204.

As discussed above, the use of a μBMC at each microserver that remains powered on and is separate from the main, in-band data path can ordinarily allow for remote power cycling and remote power control of other components of the microserver even when the microserver may be powered off or otherwise unable to communicate using the in-band data path. This can help reduce the need for operators such as data center managers from having to physically locate and access a particular microserver in a server chassis, and manually connect a laptop to a console or management port on the microserver using a special connector. This can be a difficult and time consuming process, especially when a data center manager may be responsible for multiple data centers across different geographic locations.

Figure 8:
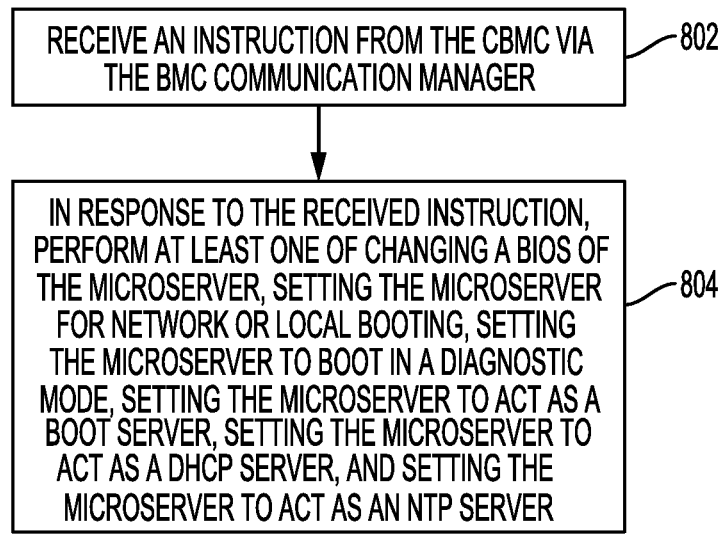
FIG. 8 is a flowchart for a remote instruction process for a microserver according to an embodiment.

FIG. 8 is a flowchart for a remote instruction process for a microserver that can be performed by μBMC 164 according to an embodiment. In block 802, μBMC 164 receives an instruction from CBMC 118 via BMC communication manager 130. As shown in FIG. 6, this may be received as a UART command, for example, via communication port 216 of μBMC 164.

In block 804, μBMC 164 performs at least one of changing a BIOS of microserver-0, setting microserver-0 for network or local booting, setting microserver-0 to boot in a diagnostic mode, setting microserver-0 to act as a boot server for other microservers, setting microserver-0 to act as a DHCP server for other microservers, and setting microserver-0 to act as an NTP server for other microservers. In making such changes or settings, processor 212 of μBMC 164 can use communication port 214 to communicate with CPUs 178 of microserver-0 via OoB port 168 using, for example, UART, GPIO, or I2C. In some cases, a command sent to CPUs 178 from μBMC 164 may be unpacked or translated by μBMC processor 212 from a UART instruction or command received from BMC communication manager 130 via communication port 216.

CPUs 178 may then make the changes or settings for the instruction such as by modifying a BIOS or other settings stored in boot NOR flash 190, NAND flash 186, or NVM 204, for example. Such changes or revisions to the settings of a conventional microserver without μBMC 164 would typically require physically accessing the console or management port (e.g., OoB port 168) using a special connector.

As discussed above, the ability to remotely power cycle, update firmware or settings, and repair microservers using the foregoing server chassis arrangements that include a μBMC at each microserver can ordinarily save time and facilitate changes that may otherwise require physically accessing a console or management port at each microserver. In addition, the above-described μBMCs can be retrofitted or installed into most existing microservers by connecting the μBMC to an OoB port at the microserver.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A server chassis, comprising:
    a plurality of microservers, each microserver including a Micro Baseboard Management Controller (μBMC);
    a Baseboard Management Controller (BMC) communication manager configured to directly communicate with each μBMC of the plurality of micro-servers; and
    a Chassis Baseboard Management Controller (CBMC) directly connected to the BMC communication manager via a plurality of protocols and configured to communicate with the BMC communication manager via the plurality of protocols,
    wherein the BMC communication manager is further configured to translate:
        at least one of the plurality of protocols to a different protocol comprising Universal Asynchronous Receiver/Transmitter (UART) full duplex for direct communication with each μBMC of the plurality of microservers; and
    wherein each μBMC of the plurality of microservers is configured to:
        receive an instruction from the CBMC via the BMC communication manager; and
        in response to the received instruction, perform at least one of modifying a Basic Input/Output System (BIOS) of a respective microserver, configuring a microserver setting for network booting or for local booting of the respective microserver, setting the respective microserver to boot in a diagnostic mode, setting the respective microserver to act as a boot server for other microservers, setting the respective microserver to act as a Dynamic Host Configuration Protocol (DHCP) server for other microservers, and setting the respective microserver to act as a Network Time Protocol (NTP) server for other microservers.

2. The server chassis of claim 1, wherein the BMC communication manager is individually connected to each microserver of the plurality of microservers.

3. The server chassis of claim 1, wherein the BMC communication manager includes at least one CBMC connector, and wherein the CBMC is further configured to select communication with one or more μBMCs of the plurality of microservers via the at least one CBMC connector.

4. The server chassis of claim 1, wherein each microserver of the plurality of microservers includes an out-of-band port, and wherein each μBMC is connected to a respective out-of-band port of the plurality of microservers.

5. The server chassis of claim 1, wherein each μBMC of the plurality of microservers is connected to at least one power controller of a respective microserver, and wherein each μBMC is further configured to:
    receive a power instruction from the CBMC via the BMC communication manager; and
    change a power state of the microserver based on the received power instruction.

6. The server chassis of claim 1, wherein each μBMC is further configured to remain powered on after a remainder of the microserver has powered off.

7. The server chassis of claim 6, wherein each μBMC includes a memory configured to store information about the microserver, and wherein when the remainder of the microserver is shutdown, the μBMC is further configured to:
    receive a request for information about the microserver from the CBMC via the BMC communication manager;
    read the requested information from the memory of the μBMC; and
    send the requested information to the CBMC via the BMC communication manager.

8. The server chassis of claim 1, wherein each microserver of the plurality of microservers include a visual indicator device controlled by a respective μBMC to visually indicate a condition of the microserver.

9. The server chassis of claim 1, wherein the CBMC is further configured to:

receive a fault condition for a microserver of the plurality of microservers from the BMC communication manager, wherein the fault condition is received by the BMC communication manager from a µBMC of the microserver; and send the fault condition to a remote device external to the server chassis.

10. A microserver, comprising:
at least one processor configured to control operation of the microserver;
at least one data port configured to send and receive data on a network;
an out-of-band port for external management of the microserver; and
a Micro Baseboard Management Controller (µBMC) connected to the out-of-band port and configured to:
communicate with a Chassis Baseboard Management Controller (CBMC) in a full duplex mode, the CBMC configured to communicate with a plurality of microservers;
communicate with the at least one processor through the out-of-band port;
remain powered on after a remainder of the microserver has powered off;
receive an instruction from the CBMC; and
in response to the received instruction, perform at least one of modifying a Basic Input/Output System (BIOS) of the microserver, configuring a microserver setting for network booting or for local booting of the respective microserver, setting the microserver to boot in a diagnostic mode, setting the microserver to act as a boot server for other microservers, setting the microserver to act as a Dynamic Host Configuration Protocol (DHCP) server for other microservers, and setting the microserver to act as a Network Time Protocol (NTP) server for other microservers.

11. The microserver of claim 10, wherein the µBMC is further configured to communicate with the CBMC through a Baseboard Management Controller (BMC) communication manager external to the microserver, and wherein the microserver is directly connected to the BMC communication manager.

12. The microserver of claim 11, wherein the µBMC is further configured to communicate with BMC communication manager using Universal Asynchronous Receiver/Transmitter (UART) full duplex.

13. The microserver of claim 10, wherein the µBMC is further configured to communicate with the at least one processor using UART.

14. The microserver of claim 10, further comprising:
at least one power controller for controlling a power supply to one or more components of the microserver; and
wherein the µBMC is connected to the at least one power controller and further configured to:
receive a power instruction from the CBMC; and
control the at least one power controller to change a power state of the microserver based on the received power instruction.

15. The microserver of claim 10, further comprising:
a Data Storage Device (DSD) for storing data received via the at least one data port; and
a power controller connected to the µBMC and to the DSD, the power controller configured to supply power to the DSD; and
wherein the µBMC is further configured to:
receive a power instruction from the CBMC; and
control the power controller to change a power state of the DSD based on the received power instruction.

16. The microserver of claim 10, wherein the µBMC includes a memory configured to store information about the microserver, and wherein when the remainder of the microserver is powered off, the µBMC is further configured to:
receive a request for information about the microserver from the CBMC;
read the requested information from the memory of the µBMC; and
send the requested information to the CBMC.

17. The microserver of claim 10, further comprising a visual indicator device, and wherein the µBMC is further configured to control the visual indicator device to visually indicate a condition of the microserver.

18. The microserver of claim 10, wherein the at least one processor is further configured to send an indication of a fault condition of the microserver to the BMC communication manager through the µBMC.

19. A Baseboard Management Controller (BMC) communication manager, comprising:
a plurality of Chassis Baseboard Management Controller (CBMC) connectors for communicating with a CBMC via a plurality of protocols, the CBMC configured to communicate with a plurality of microservers;
a plurality of Micro Baseboard Management Controller (µBMC) ports, each configured to communicate directly with a respective µBMC of a microserver of the plurality of microservers; and
a controller configured to translate at least one protocol of the plurality of protocols used to communicate with the CBMC via a CBMC connector of the plurality of CBMC connectors to a different protocol for direct communication with the respective µBMCs of the plurality of microservers via the plurality of µBMC ports; and
wherein each µBMC of the plurality of microservers is configured to:
receive an instruction from the CBMC via the BMC communication manager; and
in response to the received instruction, perform at least one of modifying a Basic Input/Output System (BIOS) of the respective microserver, configuring a microserver setting for network booting or for local booting of the respective microserver, setting the respective microserver to boot in a diagnostic mode, setting the respective microserver to act as a boot server for other microservers, setting the respective microserver to act as a Dynamic Host Configuration Protocol (DHCP) server for other microservers, and setting the respective microserver to act as a Network Time Protocol (NTP) server for other microservers.

20. The BMC communication manager of claim 19, wherein the controller is further configured to:
receive a recipient indicator from the CBMC via a CBMC connector of the plurality of CBMC connectors;
receive an instruction from the CBMC via another CBMC connector of the plurality of CBMC connectors; and
send the instruction to one or more µBMCs of the plurality of microservers based on the received recipient indicator.

21. The BMC communication manager of claim 19, wherein the different protocol for direct communication with each µBMC of the plurality of microservers is Universal Asynchronous Receiver/Transmitter (UART) full duplex.

22. The BMC communication manager of claim 19, wherein the plurality of protocols includes Inter-Integrated Circuit (I2C), Universal Asynchronous Receiver/Transmitter (UART), General Purpose Input/Output (GPIO), Intelligent Platform Management Interface (IPMI), or Management Component Transport Protocol (MCTP).

23. The BMC communication manager of claim 19, wherein the controller is further configured to:
- receive a fault condition of a microserver of the plurality of microservers via a μBMC port of the plurality of μBMC ports;
- add a tag to the received fault condition to identify the microserver that sent the fault condition; and
- send the fault condition and the tag to the CBMC via the at least one CBMC connector.

24. A server chassis, comprising:
- a plurality of microservers, each microserver including a Micro Baseboard Management Controller (μBMC);
- a Baseboard Management Controller (BMC) communication manager configured to directly communicate with each μBMC of the plurality of microservers; and
- a Chassis Baseboard Management Controller (CBMC) connected to the BMC communication manager and configured to communicate with the BMC communication manger,
- wherein each μBMC of the plurality of microservers is connected to at least one power controller of a respective microserver, and wherein each μBMC is configured to:
  - receive a power instruction from the CBMC via the BMC communication manager;
  - change a power state of its respective microserver based on the received power instruction;
  - remain powered on after a remainder of the microserver has powered off;
  - receive an instruction from the CBMC; and
  - in response to the received instruction, perform at least one of modifying a Basic Input/Output System (BIOS) of the microserver, configuring a microserver setting for network booting or for local booting of the microserver, setting the microserver to boot in a diagnostic mode, setting the microserver to act as a boot server for other microservers, setting the microserver to act as a Dynamic Host Configuration Protocol (DHCP) server for other microservers, and setting the microserver to act as a Network Time Protocol (NTP) server for other microservers.

25. The server chassis of claim 24, wherein each μBMC includes a memory configured to store information about the microserver, and wherein when the remainder of the microserver is powered off, the μBMC is further configured to:
- receive a request for information about the microserver from the CBMC via the BMC communication manager;
- read the requested information from the memory of the μBMC; and
- send the requested information to the CBMC via the BMC communication manager.

* * * * *